May 15, 1951  A. GERSHEL  2,553,137
CONTROL VALVE FOR CLUTCH OPERATING SYSTEMS
Filed Oct. 2, 1948  2 Sheets-Sheet 1
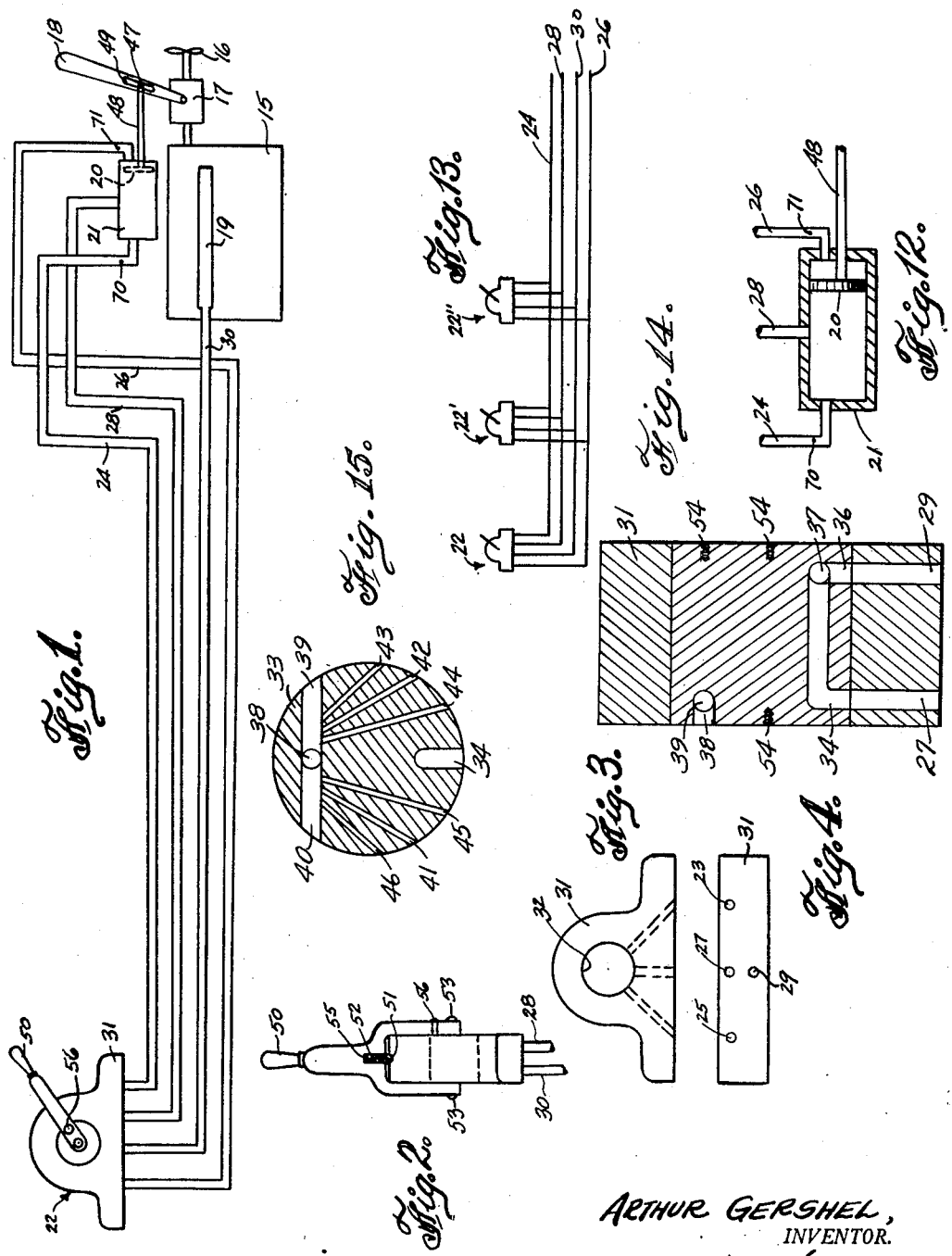
ARTHUR GERSHEL,
INVENTOR.
BY
ATTORNEY

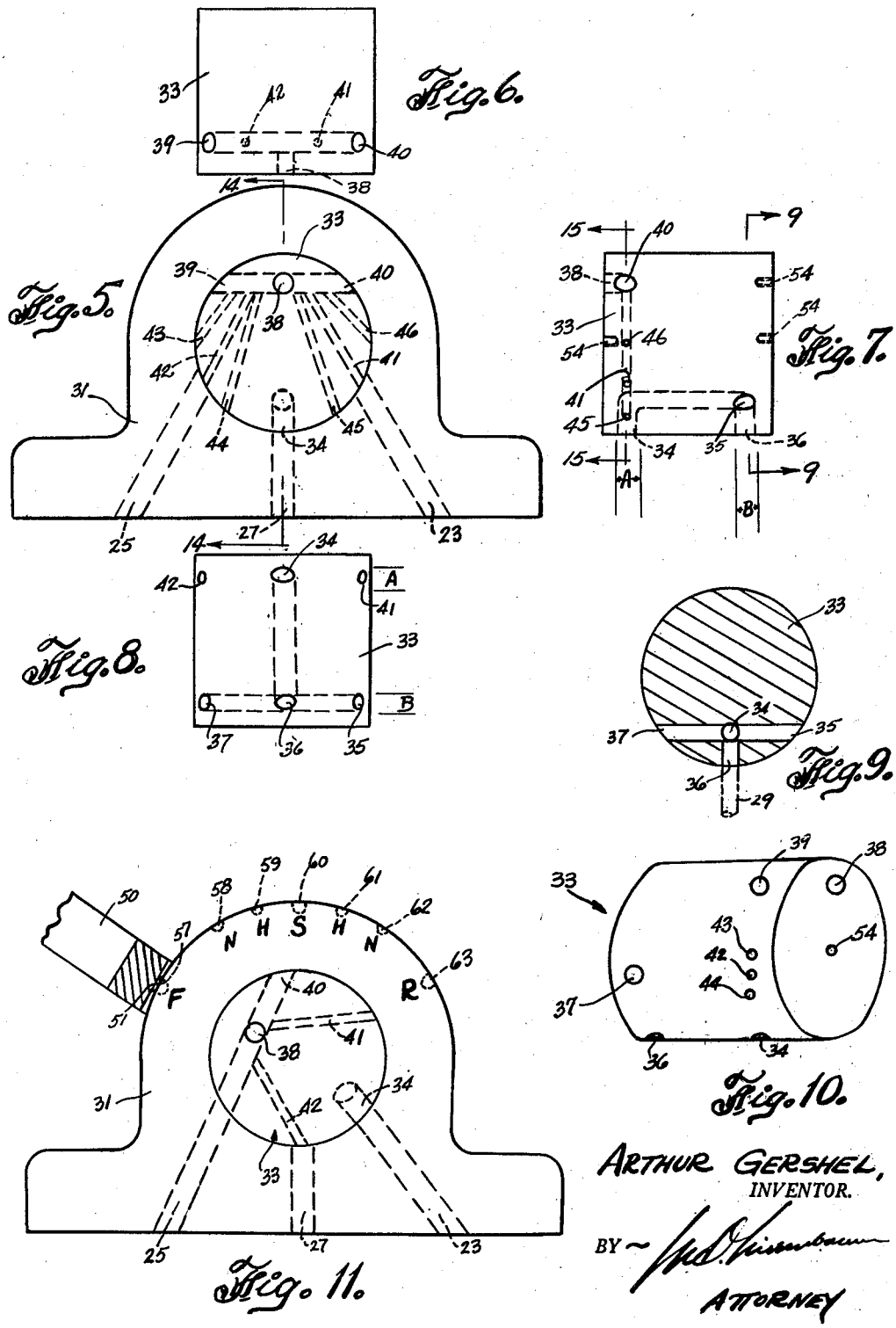

Patented May 15, 1951

2,553,137

UNITED STATES PATENT OFFICE 2,553,137

CONTROL VALVE FOR CLUTCH OPERATING SYSTEMS

Arthur Gershel, Baldwin, N. Y.

Application October 2, 1948, Serial No. 52,460

4 Claims. (Cl. 121—38)

The present invention relates particularly to an improved valve for use in a system for controlling a clutch, as for example for the power plant of a motor boat. Such systems usually employ a vacuum-operated mechanism, preferably a piston, within a cylinder having ports at its ends and middle. The piston rod is connected to the clutch, so that piston position determines clutch position. When the piston is mid cylinder, the clutch is in off position. When the piston is at one end of the cylinder, the clutch is set so that propeller operation will accomplish forward propulsion of the boat, and when the piston is at the other end of the cylinder, the clutch is set to reverse propeller rotation. For vacuum, connections are effected with the intake manifold of the engine, as a practical expedient, and such connections are controlled by such valve means.

Valves heretofore employed in such clutch control systems, either did not accomplish proper piston movement, or else proper relief within the cylinder was not provided to enable piston movement as required and as is necessary to permit direct manual operation of the clutch. On the other hand, valves heretofore employed which accomplished such operation in the desired manner, were of complicated constructions requiring many parts.

It is therefore the principal object of this invention to provide a novel and improved valve for the purpose and functions mentioned, which consists of only two parts, namely a stator member and a rotor member, which are simple in construction, and afford a valve means which is efficient in carrying out the aforementioned desired features in such control systems.

Another object of this invention is to provide a novel and improved valve for controlling clutch-operating mechanism, which also permits the clutch to be manually operated without hinderance, which eliminates seepage from its intake port when out of register with the other ports of a multiway valve means included in its structure and which automatically affords relief in said mechanism to permit proper actuation by the operating medium.

A further object hereof is to provide a novel and improved valve structure of the character described, which is simple in construction, easy to use, reasonably cheap to manufacture and efficient in carrying out the purposes for which it is designed.

Other objects and advantages will become apparent as this disclosure proceeds.

In the accompanying drawings forming part of this specification, similar characters of reference indicate corresponding parts in all the views.

Fig. 1 is a diagrammatic view showing a clutch control system including a control valve embodying the teachings of this invention.

Fig. 2 is a side view of said valve.

Fig. 3 is a front view of the valve's stator.

Fig. 4 is a bottom view of Fig. 3.

Fig. 5 is similar to Fig. 3, and shows the rotor in assembly with the stator.

Fig. 6 is a top plan view of the rotor with respect to said rotor's position shown in Fig. 5.

Fig. 7 is a side view of said rotor.

Fig. 8 is a bottom view thereof.

Fig. 9 is a section taken at lines 9—9 in Fig. 7.

Fig. 10 is a perspective view of the rotor of said valve.

Fig. 11 is similar to Fig. 5, showing the rotor in a moved position.

Fig. 12 is a diagrammatic and partially sectional, fragmentary view showing the vacuum-operated clutch moving means included in said system.

Fig. 13 is a diagrammatic view showing the manner in which the system is adapted to be controlled from several points.

Fig. 14 is a section taken at lines 14—14 in Fig. 5.

Fig. 15 is a section taken at lines 15—15 in Fig. 7.

In the drawings, the numeral 15 denotes an engine of the internal combustion type, which may be considered installed on a boat whose propeller 16 is controlled by the usual clutch 17, operated upon movement of the handle 18. When said handle is true upright, the propeller 16 is at rest. When said handle is shifted to the right of vertical as in position shown in Fig. 1, the propeller is rotated for reverse propulsion of the boat, and when said handle is shifted towards the left of vertical, the propeller is rotated for forward propulsion of the boat. Such is the common practice.

I use the vacuum from the intake manifold 19 of the engine 15, for operating a piston 20 within its cylinder 21, to accomplish the shifting of the clutch handle 18, from one position to another. A valve of the three-way type which is included in the valve structure generally designated by the numeral 22, is used to control piston movement, meaning of the piston 20.

The left end of cylinder 21, referring to Fig. 1, is connected to port 23 of said valve, by a pipe 24. The right end of the cylinder is connected to port 25 of the valve, by a pipe 26. The mid-region of said cylinder is connected to port 27 of the valve, by the pipe 28. The intake port 29 of the valve, is connected by the pipe, hose or duct 30, to the intake manifold 19 of the engine 15. All of said valve ports are in the valve stator or casing member 31, and communicative with the cylindrical bore 32 in said casing member, within which bore is positioned a rotatable barrel or valve rotor member, indicated generally by the numeral 33.

The true positions of said valve port openings are shown in Fig. 4. Their apparent distortion in Figs. 1 and 13, is to facilitate explanation of this invention by avoiding illustration which might be confusing.

The rotor member 33 of the valve means 22, is cylindrical and in rotating fit within the bore 32 of the valve stator member 31. The openings of the valve ports 23, 27 and 25 into bore 32, are equi-spaced and are adjacent the circumferential lane marked A on the rotor 33. The opening of the port 29 into said bore 32, is adjacent the lane marked B on said rotor. Said rotor member 33, is provided with two duct systems having openings in said lanes and elsewhere in its body, as will be now described.

One such duct system in said rotor, has an opening 34 in lane A, and three other openings communicative therewith in lane B. Said three openings are designated respectively by the numerals 35, 36 and 37. This particular duct system has its said openings so located on the rotor 33, that when opening 34 is in registry with any one of the openings of ports 23, 27 or 25, then the opening of port 29 is in registry with one of the openings 35, 36 or 37. Thus, a three-way valve means is provided to have vacuum play at the mid-region, or at either end of the cylinder 21, in order to accomplish any desired movement of the piston 20.

The other duct system in said valve rotor 33, has an opening 38 in an end of said rotor member, to the open air, and a plurality of openings communicative therewith in lane A. Such openings include primarily, those indicated by the numerals 39, 40, 41 and 42 to their respective duct branches, and if desired, those indicated by the numerals 43, 44, 45 and 46.

Considering the following mentioned distances measured around the periphery of the valve rotor member 33 in lane A, and the distance between the openings 25 and 27, or its equal, the distance between the openings 27 and 23, as a unit, then referring to Fig. 11 (where ducts 43, 44, 45 and 46 are omitted for clarity of illustration, or otherwise are not included), the opening 34 is intermediate and a unit distance from each of the openings 41 and 42, and also intermediate and two units distant from each of the openings 39 and 40. The opening of duct 41 is intermediate the openings of the ducts 45 and 46. The opening of duct 42 is intermediate the openings of ducts 43 and 44. All these openings are of said ducts in lane A, and the distance between such openings 43 and 45 is two units, and likewise, the distance between such openings 44 and 46 is two units aforementioned as a unit of measure.

A pin 47 extending from the piston rod 48 engages the clutch operating lever or handle 18, in slot 49, so that when the piston 20 moves in its cylinder 21, the handle 18 will be moved. Of course, the scope of movement of the piston 20, shall be sufficient to move the handle 18 to its required positions.

The diameters of ducts 25, 27, 23, 38, 39, 40, 29, 35, 36 and 37 are preferably equal, and comparatively large with respect to those of the other ducts in the valve rotor 33.

The upper surface of the valve casing or stator 31 is preferably concentric with the bore 32 and is provided with sockets at face inscriptions or designations "F" indicating forward, "S" indicating stop, and "R" to denote reverse, as shown in Fig. 11, for the positions of the clevis 50, for turning the valve rotor 33, where the valve operates the system accordingly. Similar sockets are at positions "N" indicating clevis positions where vacuum is shut off, and at positions "H" where vacuum is shut off and both ends of the cylinder 21 are connected to the outside air, by either the ducts 43 and 45, or 44 and 46, depending at which "H" the clevis 50 is positioned. At either "H" the clutch handle 18 is free for manual operation though the motor 15 be running or at rest. These mentioned sockets at clevis positions, respectively releasably receive the spring pressed pin 51, which is slidable within a socket 52 in the crotch of the handled clevis 50; the tines of the said clevis being secured to the valve rotor 33 by screws 53 in the respective tapped socket holes 54. A spring 55 is housed within the socket 52, to act on the round pointed pin 51. The clevis position on the valve rotor is vertical when said rotor member 33 is in position in the valve stator, as shown in Fig. 5. A hole 56 through one of the tines is in line with the opening 38. All of the sockets at clevis positions are in the locus of movement of said pin 51. The sockets at clevis positions are numbered from 57 to 63, respectively.

It is evident that when the clevis 50 is in position "F" whereat pin 51 is in socket 57, as in Fig. 11, vacuum action from intake manifold 19, plays in pipe 24, because port 23 is then in register with opening 34, and the port 29 is in register with the opening 37. Consider such shift of the clevis 50 from its position at "R" in Fig. 1, to that at "F" shown in Fig. 11, with engine 15 operating. Atmospheric pressure will now exist in pipe 26, because port 25 is now in register with opening 39. Although there will occur some weakening of this vacuum action because opening 42 is in registry with port 27, it is negligible. Piston 20 will be moved toward the left end of the cylinder 21, causing a reversal of the engine and the boat will travel forward. When the clutch operating handle 18 has come to its required position, vacuum is cut off by placing clevis at position "N" near position "F." This avoids any piston "urge" on the lever 18, so that clutch parts are relieved of any motion. In fact at all times while the valve means is not being operated, its clevis should be at one of the "N" positions. At all positions other than such "N" positions, the valve means in some manner effects vacuum-operated movement of the piston 20, or else at positions marked "H" permits the clutch operating lever 18 to be freely manually operated, because binding of the piston 20 within its cylinder 21, due to any vacuum condition, is relieved because with clevis 50 at either position "H," both ends of the cylinder 21 are open to atmospheric air, because either port 25 is in register with opening 43 and the port 23 in register with opening 45, or else the port 25 is in register with the opening 44 and the port 23 in register with the opening 46.

If it is desired to reverse the engine 15, the clevis 50 is now brought to position "R," whereby opening 34 will be in register with port 25, the opening 40 will be in register with port 23, opening 41 will be in register with port 27, and port 29 will be in register with opening 35. The piston 20 will be moved towards the right end of the cylinder 21, that is, again to its position as shown in Fig. 1. The boat will now be travelling backwards, and clevis 50 is placed at position "N" near position "R," until the clutch is to be manipulated again.

For the boat to stop, the clutch handle 18 need be brought to vertical. So clevis 50, is brought to position "S," as in Fig. 5. Now port 29 is in register with opening 36, as in Fig. 9, and port 27 is in register with opening 34, whereby vacuum will play in pipe 28 and piston 20 will be brought to mid-section of the cylinder 21, whereupon the position of handle 18 is vertical. Opening 42, in this position of the valve rotor, is in register with port 25, and opening 41 is in register with port 23. The loss of vacuum action through pipe 24, is as explained, negligible. Of importance is that the cylinder part in which there is no vacuum play, is relieved and opened to the free air, to avoid binding of the piston and facilitate piston movement by the vacuum acting thereon.

When clevis 50 is at position "H" with pin 51 in socket 59, opening 43 registers with port 25, and opening 45 registers with port 23, and all the other openings along lanes A and B are closed. When clevis 50 is at position "H" with pin 51 in the socket 62, opening 46 registers with port 23, and opening 44 registers with port 25, and all other openings along lanes A and B are closed. At such "H" positions, there is atmospheric pressure at both sides of the piston 20, and hence easy to be manually moved.

For convenience, I have provided two positions "N." If desired, one of them may be omitted, as by omission of the openings 43 and 45, and also socket 62. Then for manual operation, the remaining "N" position will suffice. Or else, all openings 43, 44, 45 and 46 and the "N" positions may be omitted, as shown in Fig. 11, in which instance to enable hand operation of the clutch operating handle 18, I provide a pin hole at each end of the cylinder, at positions for instance as indicated by the numerals 70 and 71.

During operation of the valve to accomplish clutch movement, clevis position should be maintained sufficient time to afford the piston all of its required travel. It is to be noted that with clevis handle in hand, it can be positioned for slight instead of full registry of openings, and can be intermittently "opened" and "closed," to "ride" the clutch. It is thereby possible to fully control clutch operation with all the incidents as if the handle 18 were manually manipulated.

The control valve 22 is mounted, if used for a boat installation, at any desired place on the boat, and attention is called to the fact that a plurality of such control valves indicated by the numerals 22, 22' and 22'', may be connected in this system, as shown in Fig. 13, and situated at different points; said valves being connected in parallel. When such plurality of valves is employed, it is essential that all valve operating handles or clevises be initially in an "N" position, and when one is manipulated for clutch operation, it shall be restored to such neutral or "closed" position, so that the system may be operable from any of said valves.

It is evident that this system controlled by one or more valve means is applicable to factory installations and is workable with the use of compressed air for example, fed into pipe line 30, instead of vacuum play from an engine intake manifold or independent source, in which case, the connection of the pipe lines 24 and 26 shall be interchanged on the cylinder 21, or else the designations "F" and "R" to change places on the valve casing surface.

It will be evident to those versed in the art, that with the provision of an axial handle for the rotor 33, instead of a clevis type handle, said rotor may be revolved a half turn from its position shown in Fig. 5, whereupon port 25 will register with opening 40, and port 23 will register with the opening 39, thereby establishing a position equivalent to that at position "H," and the openings 43, 44, 45 and 46, may then be omitted, and all functions performed with a rotor shown in Fig. 11, including relief to the open air at both sides of the piston 20, to enable free manual operation of the clutch operating handle 18.

Also to be noted, is that vacuum supply port 29 is in closed condition in lane B while it is not made communicative with any of the ports 23, 25 or 27 in lane A, thereby eliminating "seepage" incident in ordinary three-way valve constructions where intake port is in constant communication with duct in valve rotor.

To facilitate definition of this invention as set forth in the appended claims, the port 29 is referred to as the main port; the ports 23, 27 and 25, as the first, second or middle and third auxiliary ports, respectively; a duct system in the rotor 33, comprising the communicating branches, where 40 is referred to as the first branch, 41 the second branch, 42 the third branch, 39 the fourth branch and 38 the fifth branch, and also 43 and 45 as the sixth and seventh branches of said duct system; also the other duct system in said rotor, comprising the communicating branches wherein 37 is referred to as the first branch, 36 the middle or second branch, and 38 the third branch opening in one lane as explained, and 34 the fourth branch with opening in another lane as aforementioned.

Though such designations have been pointed out to relate to the valve structure illustrated, the claims shall not be limited to the specific disclosure, but shall be interpreted to apply as well to structures deemed by the patent law to be equivalents.

This invention is capable of numerous forms and various applications without departing from the essential features herein disclosed. It is therefore intended and desired that the embodiments herein described shall be deemed illustrative and not restrictive and that the patent shall cover all patentable novelty herein set forth; reference being to the following claims rather than to particular description or reference to parts herein, to indicate the scope of this invention.

I claim:

1. In a device of the character described, a stator having a cylindrical bore, a cylindrical rotor positioned close fitting within said bore and axially rotatable therein; said stator having a main port opening into said bore and a first, second and third auxiliary ports opening respectively into said bore; the rotor having a passageway so positioned whereby upon rotation of the rotor within the stator, the main port is made communicative with any of the auxiliary ports, one at a time; the openings of said auxiliary ports in said bore, being equidistant along an adjacent circumferential lane of the cylindrical surface of the rotor; said rotor also having a duct system of five communicating branches, four of which open at the cylindrical surface of said lane, and the fifth opening to the atmosphere; the auxiliary port openings and the branch duct openings in said lane, at the position of the rotor within the stator where the main port is communicative with the middle auxiliary port opening in said lane, being so positioned that the second branch is communicative with the first auxiliary port, the third branch is communicative with the third auxiliary port, and the first and fourth branches are non-communicative with any of the ports, and at the position where the main duct is communicative with the first auxiliary port, said fourth branch is communicative with the third auxiliary port, the third branch is communicative with the middle auxiliary port and the first and second branches are in non-communication with any of the ports; and at the position where the main port is communicative with the third auxiliary port, the first branch is communicative with the first auxiliary port, the second branch is communicative with the middle auxiliary port and the third and fourth branches are non-communicative with any of the ports; the first, fourth and fifth branches of the duct system being of comparatively large, and the second and third branches being of comparatively small flow-permitting capacity, a cylinder, a piston in the cylinder, a first conduit connecting one end of the cylinder to the first auxiliary port of the stator, a second conduit connecting the mid-region of the cylinder to the second auxiliary port of the stator, a third conduit connecting the other end of the cylinder with the third auxiliary port of the stator and a fourth conduit leading from the main port of the stator and adapted for connection to a means for operating the piston.

2. A valve as defined in claim 1, wherein the openings of the first and fourth branches at the periphery of the rotor are so spaced whereby at one position of the rotor within the stator, said first and fourth branches of the duct system are respectively communicative with the first and third ports in the mentioned lane and none of the other branches are in communication with the middle port in said lane.

3. A valve as defined in claim 1, wherein the duct system includes a sixth branch and a seventh branch, both communicative with fifth branch and the openings of said sixth and seventh branches in said lane of the periphery of the rotor are so spaced, whereby at one position of the rotor within the stator, said sixth and seventh branches are respectively communicative with the first and third auxiliary ports and none of the other branches are in communication with the middle port in said lane.

4. A valve as defined in claim 1, wherein the passageway in the rotor for making the main port communicative with any of the auxiliary ports upon axial rotation of the rotor with the stator, comprises a second duct system having four communicative branches, three of which open at the cylindrical surface equispaced in a second circumferential lane adjacent the main port opening in said bore and of the same spacing as of the auxiliary port openings, and the fourth branch of said second duct system, opening adjacent the first lane; whereby at a position of the rotor within the stator where such fourth branch opening of the second duct system is communicative with the middle port of the auxiliary ports, the middle branch of the second duct system is communicative with the main port.

ARTHUR GERSHEL.

REFERENCES CITED

The following references are of record in the file of this patent:

UNITED STATES PATENTS

| Number | Name | Date |
| --- | --- | --- |
| 1,046,529 | Winton | Dec. 10, 1912 |
| 1,799,453 | Blundon | Apr. 7, 1931 |
| 2,099,422 | Farmer | Nov. 16, 1937 |
| 2,165,096 | Frechette | July 4, 1939 |
| 2,439,515 | Hodgson | Apr. 13, 1948 |